(12) United States Patent
Na et al.

(10) Patent No.: US 7,385,314 B2
(45) Date of Patent: Jun. 10, 2008

(54) POWER SUPPLY HAVING POWER SAVING MODE

(75) Inventors: Tae-kwon Na, Chungju (KR);
Jin-hwan Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 467 days.

(21) Appl. No.: 10/321,526

(22) Filed: Dec. 18, 2002

(65) Prior Publication Data
US 2003/0137198 A1 Jul. 24, 2003

(30) Foreign Application Priority Data
Jan. 19, 2002 (KR) ................. 2002-3174

(51) Int. Cl.
*H02J 3/00* (2006.01)
*H01H 35/00* (2006.01)
*H02J 7/02* (2006.01)
(52) U.S. Cl. ............... 307/150; 307/83; 307/116
(58) Field of Classification Search ........... 307/83, 307/116, 150; 340/687
See application file for complete search history.

(56) References Cited

U.S. PATENT DOCUMENTS

| | | | | |
|---|---|---|---|---|
| 4,086,502 A | * | 4/1978 | Toth | 307/116 |
| 5,008,846 A | * | 4/1991 | Inoue | 713/321 |
| 5,621,256 A | * | 4/1997 | Crane et al. | 307/125 |
| 5,995,384 A | * | 11/1999 | Majid et al. | 363/21.18 |
| 6,301,131 B1 | * | 10/2001 | Yoshida | 363/44 |
| 6,418,492 B1 | * | 7/2002 | Papa et al. | 710/302 |
| 2002/0006045 A1 | * | 1/2002 | Shirai et al. | 363/17 |

FOREIGN PATENT DOCUMENTS

| | | |
|---|---|---|
| JP | 09-244767 | 9/1997 |
| JP | 11-299092 | 10/1999 |
| JP | 2000-333461 | 11/2000 |
| JP | 2001-161065 | 6/2001 |

OTHER PUBLICATIONS

A Notice of Reason for Rejection, English translation of Office Action of JP 2002-380387 (the documents cited therein submitted with IDS filed Oct. 14, 2004).

* cited by examiner

*Primary Examiner*—Stephen W Jackson
*Assistant Examiner*—Hal I. Kaplan
(74) *Attorney, Agent, or Firm*—Staas & Halsey LLP

(57) ABSTRACT

A removably connected power supply for supplying external power to an electronic product. An output unit supplies power to the electronic product. A switching unit selects whether to supply the power to the output unit, and a switching apparatus turns on the switching unit in response to being connected with the electronic product and turns off the switching unit in response to being disconnected from the electronic product. The switching apparatus includes a switch which performs a switching operation in response to the connection or disconnection with the electronic product from the output unit. A switching element controls operation of the switching unit in response to the operation of the switch. Thus, the power supply is operated in a power saving mode and unnecessary power consumption and damage caused by voltage or current spikes are prevented.

8 Claims, 6 Drawing Sheets

X-AXIS: SEC/DIVISION
Y-AXIS: VOLTS/DIVISION

X-AXIS: SEC/DIVISION
Y-AXIS: VOLTS/DIVISION

POWER SUPPLY HAVING POWER SAVING MODE

CROSS REFERENCE TO RELATED APPLICATIONS

This application claims the benefit of Korean Application No. 2002-3174 filed Jan. 19, 2002, in the Korean Intellectual Property Office, the disclosure of which is incorporated herein by reference.

BACKGROUND OF THE INVENTION

1. Field of the Invention

The present invention relates to a power supply, and more particularly, to a power supply having a function of a power saving mode.

2. Description of the Prior Art

As shown in FIG. 1, a conventional SMPS (switching modulation power supply) has an input unit 1 including F, L G, and N terminals, a rectification unit 2, a switching unit 3 including IS, FB, RT, CT, OUT, and CS terminals, a feedback unit 4, and an output unit 5.

External AC power is supplied through the input unit 1, and the input AC power is converted into DC power by a bridge diode in the rectification unit 2. The rectified power is supplied to the output unit 5, through a transformer in response to an operation of the switching unit 3.

The feedback unit 4 detects a ripple in a reference voltage (+5V) output by the transformer, and feeds back the increase and the decrease of ripple to a feedback terminal FB of a Pulse Width Modulator-Integrated Circuit (PWM-IC) 31 through photo couplers PC1-1 and PC1-2 and an associated photo transistor.

The PWM-IC 31 maintains an output voltage as a constant voltage by controlling the power output to the output unit 5 through PWM (pulse width modulation) based on the feedback signal from the output unit 5.

The output unit 5, illustrated in FIG. 1 includes a power supply terminal 51 for supplying input power input to an electronic product, and a general ground terminal 52, shown in FIG. 2. Where the output unit 5 is connected to the electronic product, the electronic product is operated by using a predetermined power output from the power supply terminal 51 of the output unit 5 as an operational power.

Where the power supply is used, the power supply is connected and disconnected to and from the electronic product in a state where external power is being supplied to the power supply.

For example, where the power supply is disconnected from the electronic product, there is are risks of damage to internal elements of the power supply and consumption of unnecessary power due to unnecessary operation of the power supply because the external power is constantly being supplied to the power supply.

Moreover, there is another risk of damage of the electronic product and the power supply due to a peak electric current and voltage such as the spike voltage T shown in region R of FIG. 3. Where the power supply is connected to the electronic product while the power supply is being supplied with the external power, the peak electric current and voltage are generated. That is, the spike is generated by an inrush current to the electronic product. The inrush current occurs due to suddenly connecting the electronic product to the power supply while the output of the power supply is available.

Therefore, the conventional power supply has a risk of damage and consumption of unnecessary power over a long period of time.

SUMMARY OF THE INVENTION

The present invention has been made to overcome the above-mentioned problem of the related art. Accordingly, it is an object of the present invention to provide a power supply which prevents the generation of a peak (spike) electrical current on connection to an electronic product and which has a function of saving electric power.

Additional objects and advantages of the invention will be set forth in part in the description which follows, and, in part, will be obvious from the description, or may be learned by practice of the invention.

The above and other objects of the present invention are accomplished by providing a removably connectable power supply for supplying external power to an electronic product, comprising: an output unit which supplies input power to the electronic product; a switching unit which selects whether to supply the power to the output unit; and a switching apparatus which turns on the switching unit where the output unit is connected with the electronic product and turns off the switching unit where the output unit is disconnected from the electronic product.

The switching apparatus comprises a switch which performs a switching operation in response to a state of connection or disconnection with the electronic product and the output unit, and a switching element which controls an operation of the switching unit in response to the operation of the switch.

The switch may be disposed at a power supply terminal of the output unit in order to be grounded via a ground terminal of the output unit. In this state, the switching element is turned on and the operation of the switching unit is interrupted, thus the power supply to the output unit is interrupted as well. In other words, the power supply is in a power saving mode.

The switch is in an open state with the ground terminal where the output unit is connected in the electronic product. In this state, the switching element is turned off and the switching unit is operated, thus the power is supplied to the output unit.

Therefore, where the electric power supply is not connected with the electric product, the electric power supply is in the power saving mode, thus unnecessary consumption of power can be prevented.

BRIEF DESCRIPTION OF THE DRAWINGS

The above-mentioned objects and features of the present invention will become more apparent by describing the preferred embodiment of the present invention by referring to the appended drawings, in which.

DESCRIPTION OF THE PREFERRED EMBODIMENT

Figure 1:
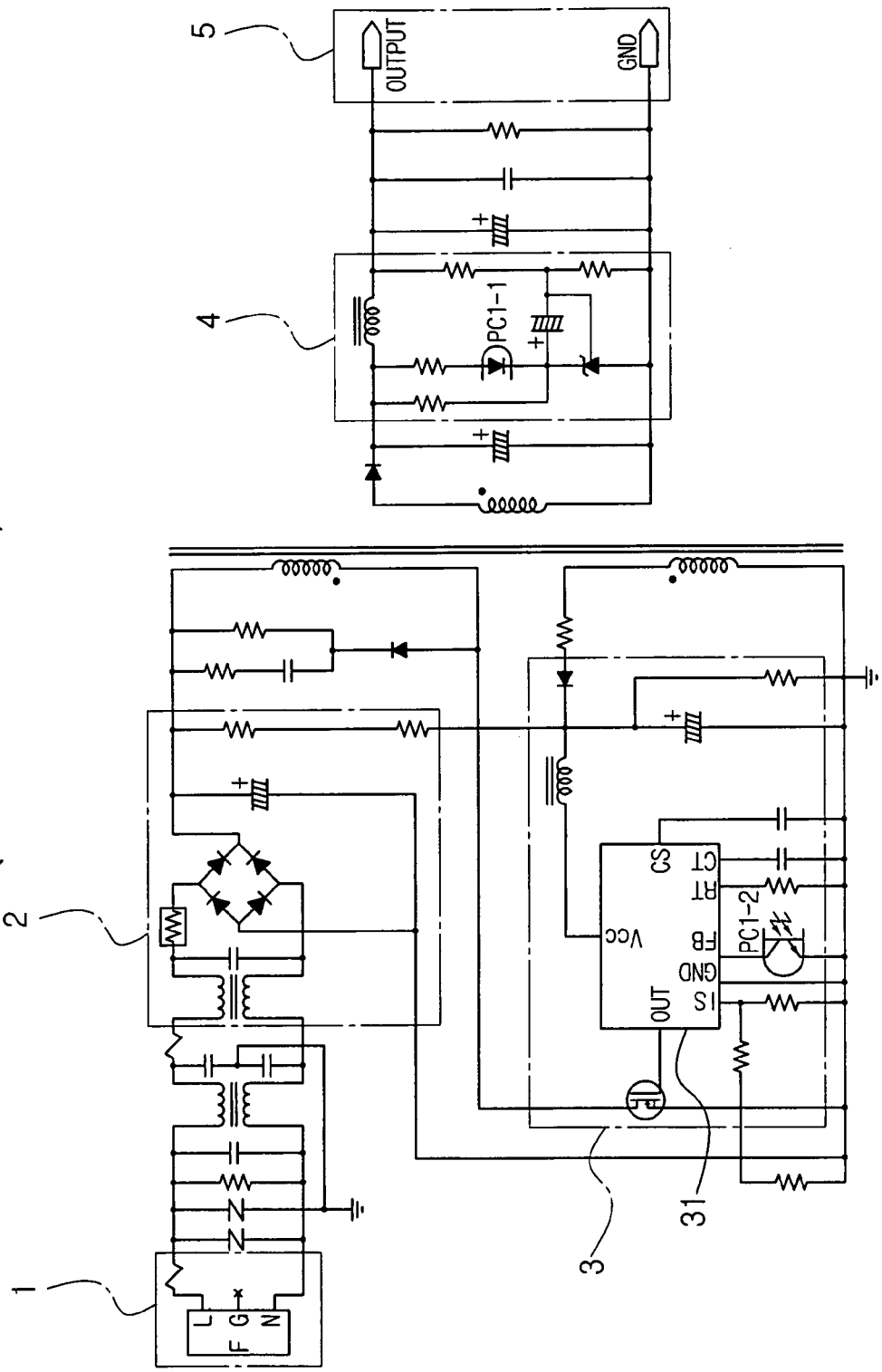
FIG. 1 is a detailed diagram of a conventional SMPS power supply.
Figure 2:
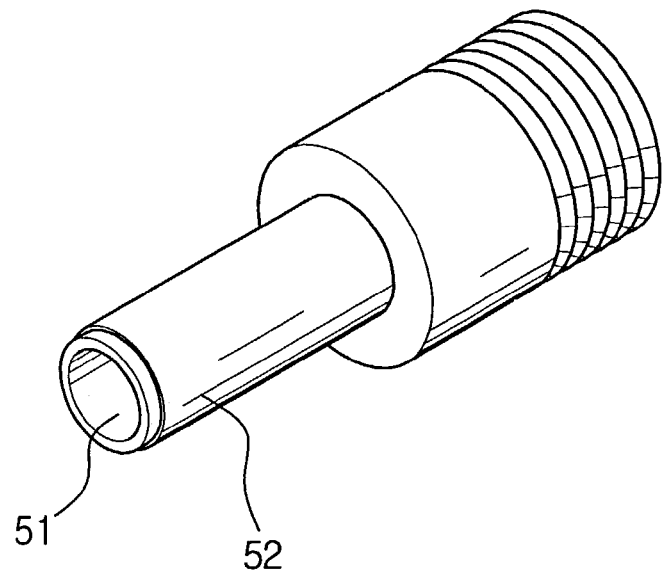
FIG. 2 is a view showing an appearance of an output unit of FIG. 1.
Figure 3:
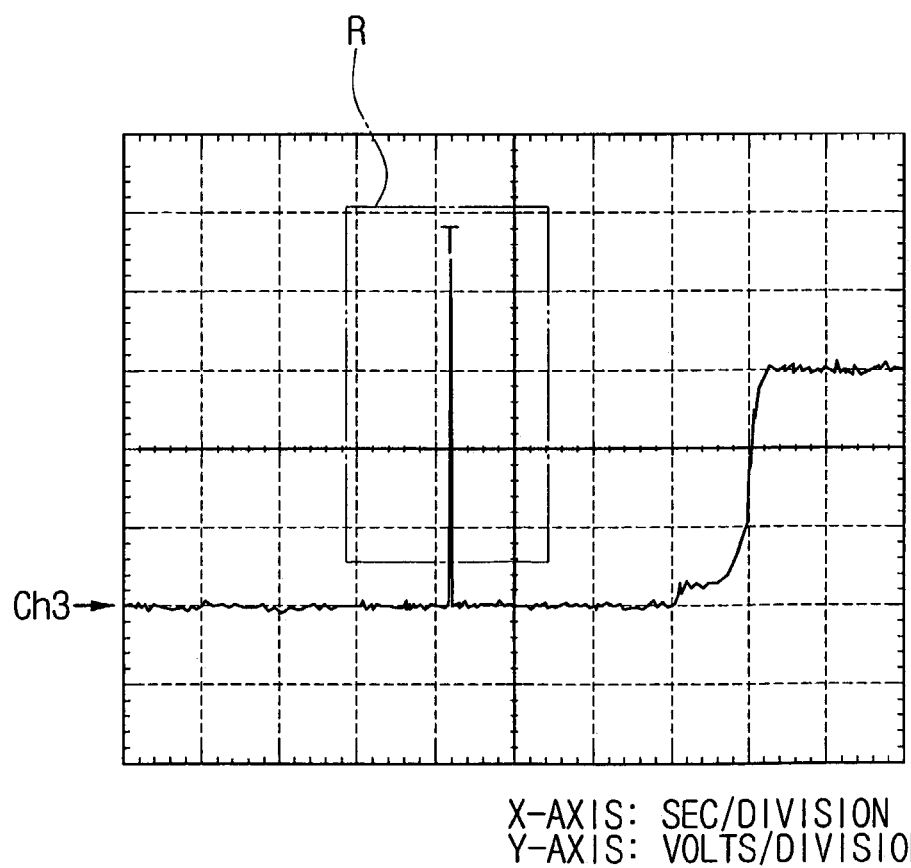
FIG. 3 is an output wave form of an output of the power supply of FIG. 1 appearing in an oscilloscope.

Reference will now be made in detail to the present embodiments of the present invention, examples of which are illustrated in the accompanying drawings, wherein like reference numerals refer to like elements throughout.

Figure 4:
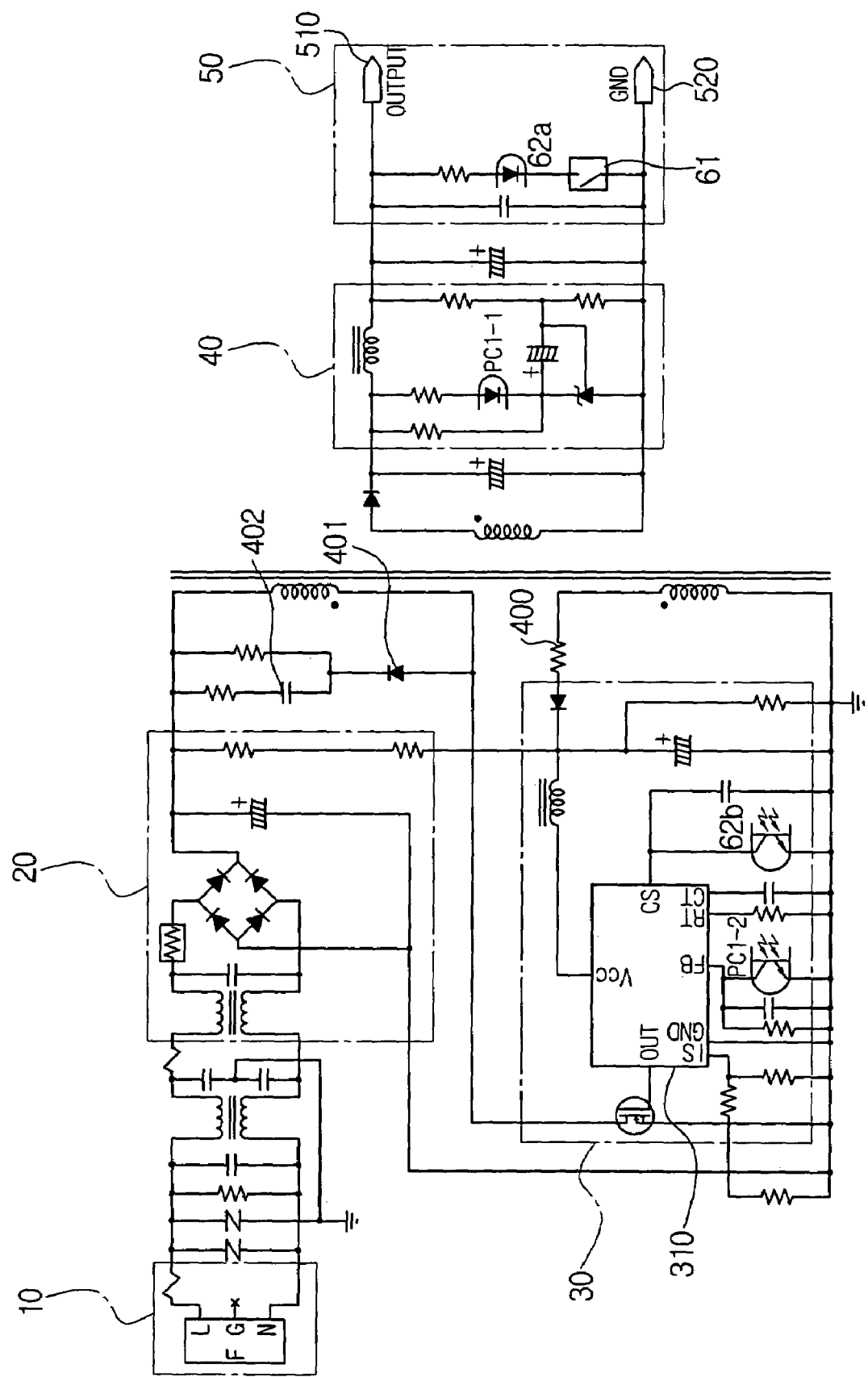
FIG. 4 is a detailed diagram of a power supply of the present invention.

As shown in FIG. 4, the power supply of the present invention comprises an input unit 10 including F, L G, and N terminals, a rectification unit 2, a switching unit 3 including IS, FB, RT, CT, OUT, and CS terminals, a feedback unit 40, and an output unit 50.

Where the input unit 10 is connected with an external AC power source, AC power is input to the power supply. The rectification unit 20 rectifies the input external AC power, and converts the AC power into DC power.

The PWM switching unit 30 is disposed at a first part of a transformer. A first DC power is coupled to a second part through the transformer by the operation of the PWM switching unit 30, and is rectified to a second DC power through a predetermined diode and a capacitor. After that, the second DC power is supplied to the output unit 50.

The feedback unit 40 detects a ripple element in a reference voltage (+5V) output by the transformer, and transmits variations of the ripple to a feedback end VFB of a PW-MIC 310 through a photo coupler PC1-1 and an associated photo transistor PC1-2. The PWM-IC 310 maintains a voltage output to a power supply terminal 510 of the output unit 50 through PWM (pulse width modulation).

Figure 5:
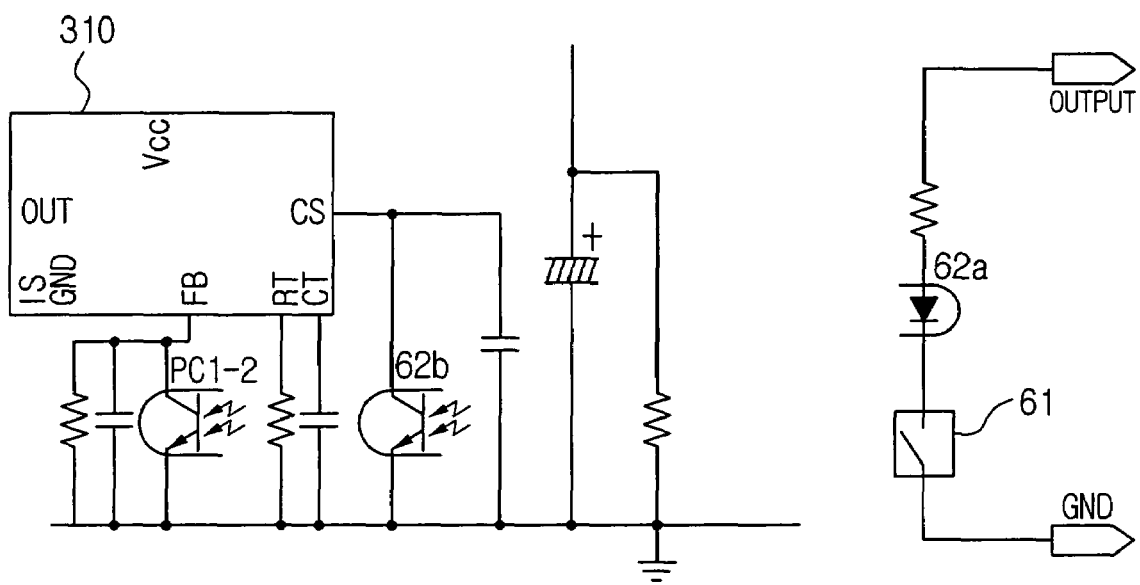
FIG. 5 is an enlarged view of portions of the power supply illustrated in FIG. 4.

FIG. 5 is an enlarged view of portions of the power supply illustrated in FIG. 4. The output unit 50 outputs a predetermined DC power by the operation of the PWM switching unit 30 at the power supply terminals 510 and 520. The power supply supplies a predetermined power to an electronic product (not shown) through the power supply terminal 510 and a ground terminal 520.

The output unit 50 comprises a switch 61 which performs a switching operation according to whether the output unit 50 and the electronic product (not shown) are connected, and a photo coupler 62a which optically communicates with a photo transistor 62b to control the operation of the PWM switching unit 30 in response to the switching operation of the switch 61.

Figure 7:
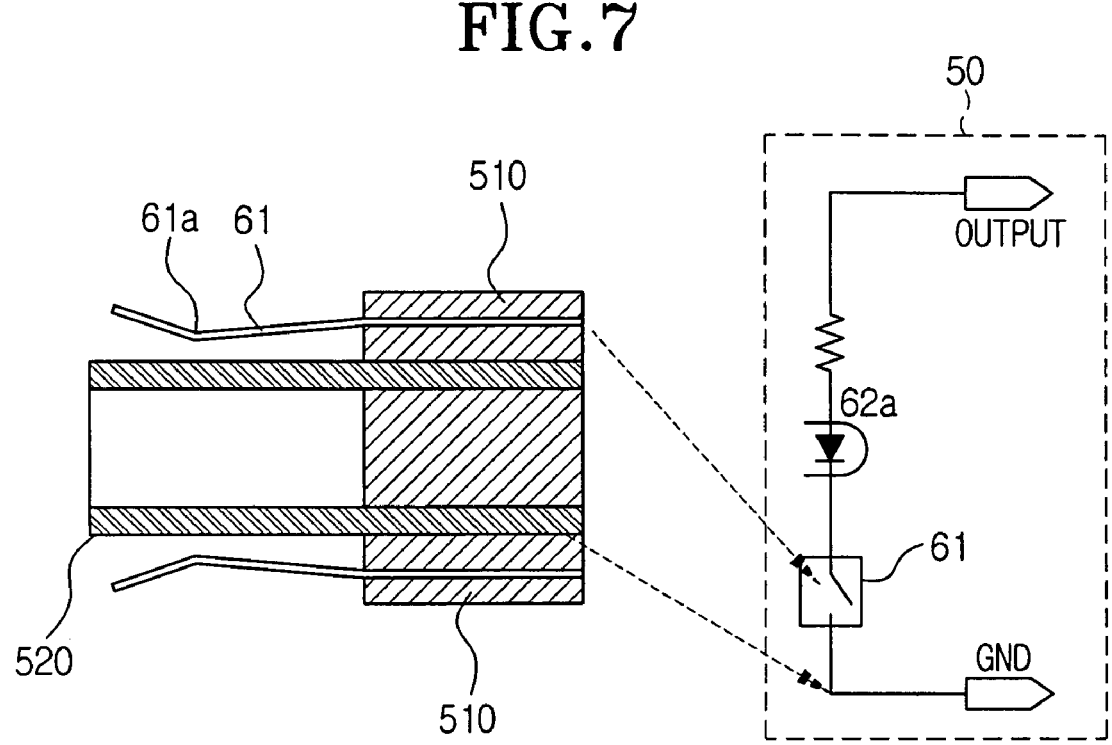
FIG. 7 is a view correlating a portion of the connection diagram shown in FIG. 5 and the appearance of the output unit of FIG. 4.

As shown in FIG. 7, the switch 61 of the output unit 50 is integrally constructed with the power supply terminal 510 of the output unit 50.

Figure 6A:
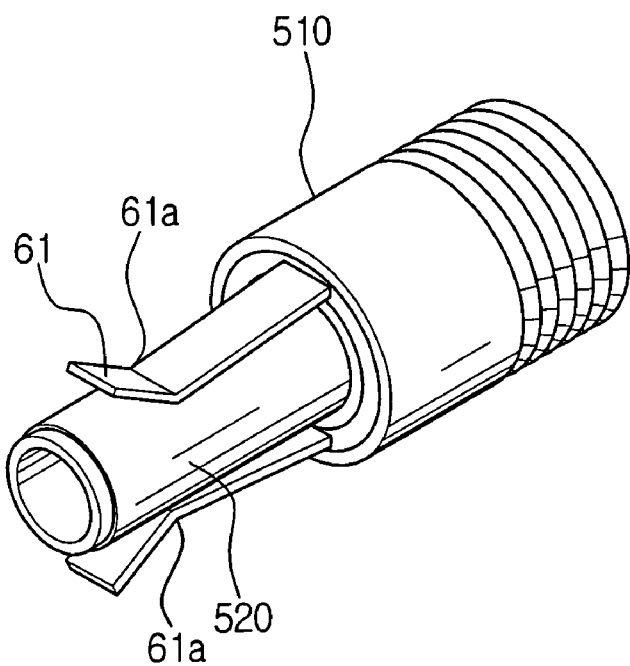
FIG. 6A is a view illustrating an appearances of the output unit of FIG. 4 in a state where the output unit is disconnected from an electronic product.
Figure 6B:
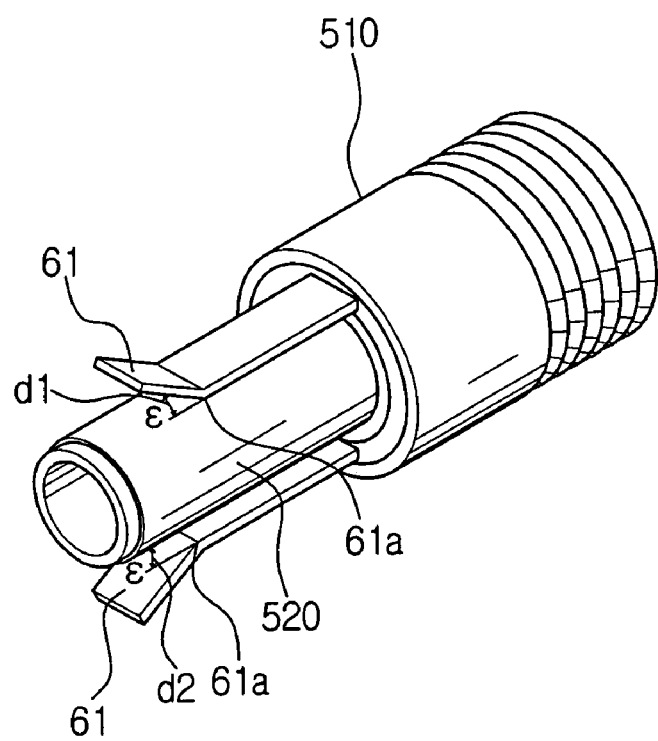
FIG. 6B is a view illustrating an appearance of the output unit of FIG. 4 in a state where the output unit is connected to the electronic product.

When the output unit 50 illustrated in FIG. 4 is disconnected from the electronic product, contacts 61a of the switch 61 contact the ground terminal 520 of the output unit 50 as shown in FIG. 6A. When the output unit 50 illustrated in FIG. 4 is connected in the electronic product, the contacts 61a of the switch 61 are separated from the ground terminal 520 by distances of d1 and d2, and thus the switch 61 is opened from the ground terminal 520, as shown in FIG. 6B.

In other words, the operation of the PWM switching unit 30 is controlled as the photo coupler 62a and the photo transistor 62b are operated in response to opening and closing of the switch 61.

The controlling of the switch 61 of the output unit 50 and the PWM switching unit 30 in response to the operation of the photo coupler 62a and the photo transistor 62b will be described in further detail.

When the external AC power is input through the input unit 10 of the SMPS (switching modulation power supply), the AC power is rectified by the rectification unit 20, and the rectified first DC power is provided to the first part of the transformer. In addition, the rectified first DC power is supplied as an operation power Vcc of the PWM-IC 310 of the PWM switching unit 30 through a predetermined resistance 400. When the PWM-IC 310 is operated, the rectified first DC power of the first part of the transformer is coupled to the second part of the transformer by a switching operation of a field effect transistor FET. After that, the transformer coupled power is rectified to a second DC power by a diode 401 and filtered by a capacitor 402. The rectified second DC power supplies the power (+5V) to the electronic product connected with the output unit 50 through the power supply terminal 510 of the output unit 50.

The feedback unit 40 detects the ripple element in the reference voltage (+5V) output by the transformer and diode, and transmits the variations of the ripple to the feedback terminal FB of the PWM-IC 310 through the photo coupler PC1-1 and the photo transistor PC1-2. The PWM-IC 310 maintains the voltage output to the power supply terminal 510 of the output unit 50 through the PWM (pulse width modulator).

The operation of the PWM switching unit 30 is controlled according to the operation of the switch 61, the photo coupler 62a and the photo transistor 62b.

As shown in FIG. 6A, when the power supply is disconnected from the electronic product, the switch 61 of the output unit 50, illustrated in FIG. 4, of the power supply is grounded via the ground terminal 520. Under this condition, the photo coupler 62a emits light and the photo transistor 62b is operated. The photo transistor 62b has a collector which is connected with a CS terminal of the PWM-IC 310 of the PWM switching unit 30 and an emitter which is connected to ground. Where the photo coupler 62a emits light, the photo transistor 62b conducts, thus the CS terminal of the PWM-IC 310 is grounded, and the operation of the PWM-IC 310 is stopped. The operation of the PWM-IC 310 is stopped such that the rectification unit 20 and the second part of the transformer are electrically disconnected from each other. However, the magnetic energy is only transmitted between the rectification unit 20 and the second part by the transformer. Thus, the operation of the photo coupler 62a is possible although the operation of the PWM-IC 310 is stopped.

Accordingly, the photo couplers 62a and 62b are operated such that the CS terminal of the PWM-IC 310 is grounded. Therefore, the power supply is in a power saving mode and unnecessary power consumption is prevented.

For example, a result of an experiment where the external power is supplied in a state where the power supply is disconnected from the electronic product is as follows. The power consumption of the conventional power supply is 2.75 W, and the power consumption of the power supply according to the present invention is 0.78 W. It will be recognized that this is a remarkable power saving effect. Thus, where the power supply and the electronic product are disconnected from each other, there is hardly any power consumption in the power supply.

Where the power supply is connected to the electronic product, the switch 61 of the output unit 50 is opened from the ground terminal 520 by a connection unit (not shown) of the electronic product. Where the switch is opened, the photo coupler 62a ceases to emit light and the photo transistor 62b stops conducting, releasing the PWM-IC 310 CS terminal from ground potential so that the PWM-IC 310 beings a switching operation. In other words, the CS terminal of the PWM-IC 310 of the PWM switching unit 30 enters a normal operation state.

When the operation of the PWM switching unit 30 enters the normal state, the input external power is supplied to the power supply terminal 510 of the output unit 50 as in the operation of the SMPS described before, and the power (+5V) is supplied to the electronic product connected with the output unit 50.

In the embodiment described above, the operation of the PWM-IC 310 is stopped as the CS terminal of the PWM-IC 310 is grounded. It will be appreciated that where a PWM-IC element is different from the PWM-IC 310, the operation of the PWM-IC may be controllable by controlling a different terminal of the PWM-IC.

Figure 8:
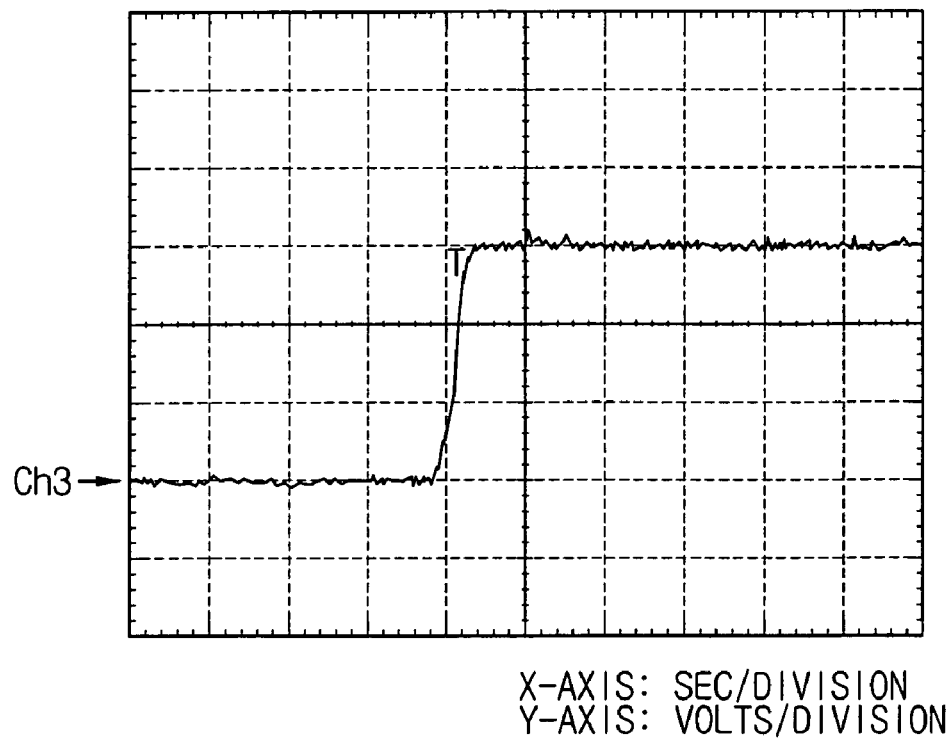
FIG. 8 is an output waveform of an output of the power supply of FIG. 4 appearing in an oscilloscope.

Accordingly, where the power supply is connected to the electronic product, the power input through the input unit 10 is supplied to the electronic product as a predetermined power. Where the power supply is disconnected from the electronic product, the power supply is operated in a power saving mode which stops operation of portions of the power supply which are not necessary to maintain the power supply in a standby or power saving mode.

Where the power supply is connected to the electronic product, the power supply and the electronic product are protected from sudden peaks in electric current and voltage.

Where the power supply is disconnected from the electronic product, the power supply is operated in the power saving mode. Thus, the output voltage of the power supply is zero. Therefore, as shown in FIG. 8, even when the power supply is connected in the electronic product, the peak electric current and voltage caused by the sudden application of the voltage and sudden flow of current is not generated.

As described above, even where the external power is supplied in the state that the power supply is operated in the power saving mode, unnecessary power consumption is prevented.

Additionally, as the peak generated by the sudden current and voltage is eliminated, damage to the electronic product and the power supply is prevented.

According to the present invention, since the operation of the power supply is controlled in response to whether the power supply is connected to the electronic product, where the power supply is not used, the power supply is operated in the power saving mode. Thus, unnecessary power consumption is prevented, and the damage caused by the peak electric current and voltage is also prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A removably connectable power supply for supplying power to an electronic product, comprising:
   an output unit which supplies the power to the electronic product and includes a photo coupler;
   a switching unit which selects whether to supply the power to the output unit; and
   a switching apparatus which turns on the switching unit when the output unit is connected with the electronic product and turns off the switching unit when the output unit is disconnected from the electronic product, the switching apparatus including contacts separable from a ground terminal of the removably connectable power supply when the removably connectable power supply is connected to the electronic product to supply power to the output unit;
   wherein the switching apparatus activates the photo coupler when the output unit is disconnected from the electronic product in order to interrupt power to the output unit.

2. The power supply of claim 1, wherein the switching apparatus comprises:
   a switch which performs a switching operation in response to connection or disconnection of the electronic product and the output unit, and
   a switching element which controls the operation of the switching unit in response to the operation of the switch.

3. The power supply of claim 2, wherein the switching element is a a photo transistor.

4. The power supply of claim 2, wherein:
   the switch is disposed at a power supply terminal of the output unit, and
   upon the disconnection of the power supply and the output unit, the switching element is turned on and the operation of the switching unit is interrupted, thus interrupting the power to the output unit.

5. The power supply of claim 2, wherein:
   the switch is disposed at a power supply terminal of the output unit, and
   upon the connection of the power supply and the output unit, the switching element is turned off and the switching unit is operated, thus the power is supplied to the output unit.

6. The power supply of claim 4, wherein:
   the switch is operable to be grounded with the ground terminal of the output unit in response to the output unit being disconnected from the electronic product.

7. The power supply of claim 5, wherein the switch is operable to disconnect from the ground terminal of the output unit in response to the output unit being connected with the electronic product.

8. A removably connectable power supply for supplying power to an electronic product, comprising:
   an output unit which supplies the power to the electronic product;
   a switching unit which selects whether to supply the power to the output unit; and
   a switching apparatus which turns on the switching unit when the output unit is connected with the electronic product and turns off the switching unit when the output unit is disconnected from the electronic product;
   wherein the output unit emits light in response to disconnecting the removably connectable power supply from the electronic product to interrupt power to the output unit.

* * * * *

UNITED STATES PATENT AND TRADEMARK OFFICE
CERTIFICATE OF CORRECTION

| | | |
|---|---|---|
| PATENT NO. | : 7,385,314 B2 | Page 1 of 1 |
| APPLICATION NO. | : 10/321526 | |
| DATED | : June 10, 2008 | |
| INVENTOR(S) | : Tae-kwon Na et al. | |

It is certified that error appears in the above-identified patent and that said Letters Patent is hereby corrected as shown below:

Column 6, Line 27, before "photo" delete "a".

Signed and Sealed this

Seventh Day of October, 2008

JON W. DUDAS
*Director of the United States Patent and Trademark Office*